United States Patent [19]

Clark

[11] Patent Number: 5,090,600

[45] Date of Patent: Feb. 25, 1992

[54] LIQUID PRESSURE OPENED POURING SPOUT

[76] Inventor: Robert D. Clark, 3911 Timberidge Dr., Norman, Okla. 73072

[21] Appl. No.: 728,827

[22] Filed: Jul. 9, 1991

Related U.S. Application Data

[63] Continuation of Ser. No. 542,992, Jun. 25, 1990, abandoned.

[51] Int. Cl.⁵ .............................................. B65D 25/40
[52] U.S. Cl. ................................... 222/492; 222/212; 222/449; 222/453; 222/476; 222/496; 222/514; 222/568
[58] Field of Search ............... 222/212, 213, 361, 362, 222/449, 453, 476, 500, 492–497, 513, 514, 518, 523, 482, 485, 559, 568, 570

[56] References Cited

U.S. PATENT DOCUMENTS

| | | | |
|---|---|---|---|
| 682,855 | 9/1901 | Lucas | 222/476 X |
| 1,912,022 | 5/1933 | Thompson | 222/496 |
| 1,977,869 | 10/1934 | Ulm | 222/492 |
| 2,658,648 | 11/1953 | Tribbitt | 222/500 X |
| 2,828,893 | 4/1958 | Stewart et al. | 222/453 |
| 2,864,538 | 12/1958 | Rasmussen | 222/361 |
| 2,904,227 | 9/1959 | Graham | 222/213 |
| 3,107,828 | 10/1963 | Costakos | 222/453 X |
| 3,128,915 | 4/1964 | Matter | 222/449 X |
| 3,134,514 | 5/1964 | Booth | 222/453 X |
| 3,180,539 | 4/1965 | Petronello | 222/496 |
| 3,844,454 | 10/1974 | Buchtel | 222/476 X |
| 4,429,834 | 2/1984 | Ito | 222/212 |
| 4,572,386 | 2/1986 | Marcus | 222/568 |
| 4,702,473 | 10/1987 | Paquette | 222/212 |

FOREIGN PATENT DOCUMENTS 3411200  10/1985  Fed. Rep. of Germany ...... 222/476

*Primary Examiner*—Kevin P. Shaver
*Attorney, Agent, or Firm*—Robert K. Rhea

[57] ABSTRACT

A fluid pressure opened reclosable pouring spout for a flexible container is formed by a sleeve assembly axially inserted into the exit end of the pouring spout for normally closing the latter. The sleeve assembly comprises a first sleeve bonded to the inner surface of the pouring spout of the exit end portion which contains an annular inwardly projecting flange-like wall slidably receiving a piston sleeve valve normally sealing with the outer end of the first sleeve and biased to an open position by a spring or weight when the walls of the container are manually squeezed, to apply liquid pressure against the closed end of the piston sleeve valve. The wall of the piston sleeve valve is provided, adjacent its outer end, with a circumferential row of apertures for discharging liquid when the piston sleeve valve is opening. The inward end of the piston sleeve valve is longitudinally slotted in circumferential spaced relation for inserting the sleeve valve into the wall sleeve.

8 Claims, 3 Drawing Sheets

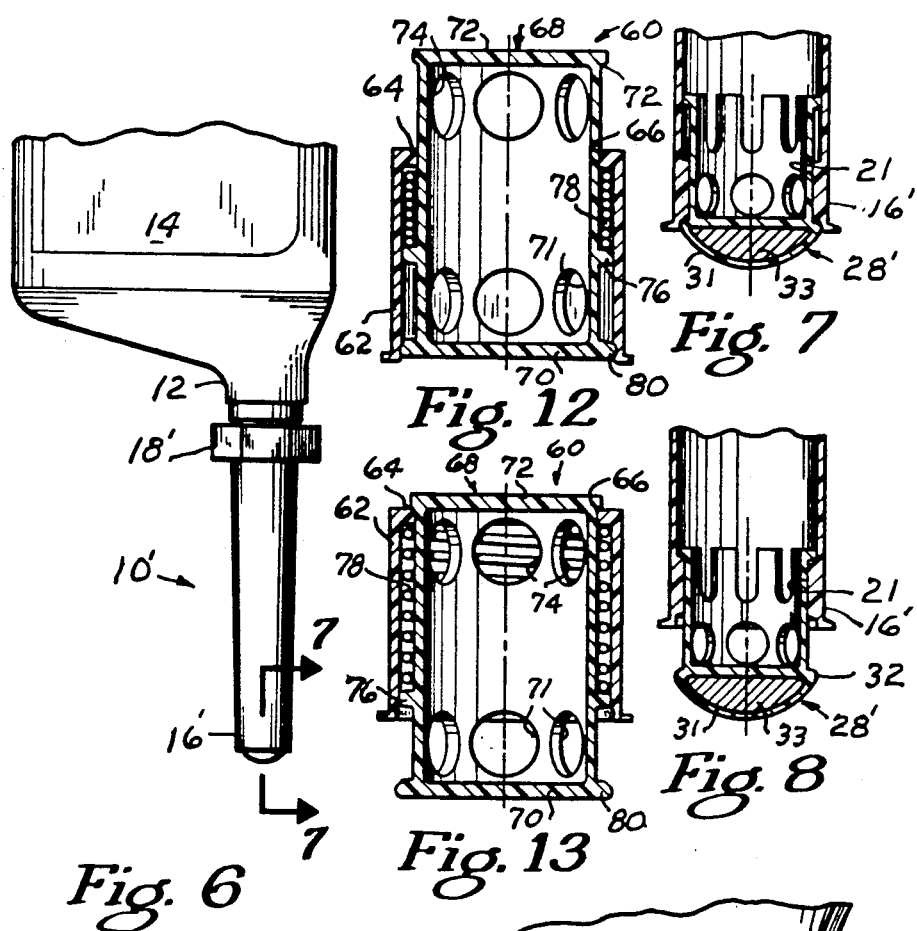

LIQUID PRESSURE OPENED POURING SPOUT

This application is a continuation of application Ser. No. 07/542,992 filed 6/25/90 now abandoned.

BACKGROUND OF THE INVENTION

1. Field of the invention

This invention relates to flexible plastic wall liquid containers and more particularly to a valve equipped pouring spout opened by squeezing the side walls of a full container.

There are many circumstances when an extension such as an attached spout or funnel is either necessary or desired to avoid spilling when pouring liquids from a portable container into another container, a vehicle engine, or the like.

These devices help but are often inadequate for the reason the liquid starts to flow as soon as the container is partially inverted, after being opened and before it is properly positioned for discharge of the liquid.

The recent proliferation of flexible plastic containers for lubricating oil and liquids of all descriptions, has made it apparent that a reusable extension with a valve closure at its exhaust end that can be remotely opened by liquid pressure generated by squeezing the container walls would be very desirable. This invention provides a container spout which permits the user to position the end of the spout in the receiving opening with the portable container inverted before generating liquid flow by squeezing the container walls of the prior art.

2. Description of the Prior Art

The prior art discloses a multitude of container spout or open top container closing members generally formed by thin wall cam members either overlying the periphery or discharge end of the pour spout or inserted in a snap action into a groove within the inner periphery of the pouring spout.

Such container closing members are generally satisfactory where the opening is to be manually opened before inverting or partially inverting the container for pouring. However, such a closure member would result in unwanted sudden discharge of a considerable amount of the liquid from a flexible wall plastic container if such a spout seal was opened by pressure on the container walls.

This invention is distinctive over these prior container neck or spout closures by providing a pouring spout which includes a piston valve in its exhaust end normally seated in a spout closed position but liquid pressure moved in an outward direction by pressure applied to plastic container walls moving the piston valve to a valve open position for discharging liquid from the container.

SUMMARY OF THE INVENTION

The inner wall surface of the exit end of a container pouring spout is provided with an inwardly projecting ledge forming an annular wall spaced inwardly from its exhaust end surface.

The pouring spout inner wall is further provided with a verge or annular part circular recess forming a valve seat.

A piston sleeve valve is axially received by the exhaust end portion of the pouring spout.

The piston sleeve valve is characterized by an outward closed end having an annular outstanding flange in the plane of its closed end and having an outstanding flange at the inner end limit of the piston. Adjacent its outwardly disposed end, the piston sleeve valve wall is provided with a plurality of apertures and the inward end portion of the piston wall is provided with a plurality of slots open through its inner end edge.

In one embodiment, the piston valve is normally biased outwardly to a spout open position by a spring surrounding the piston valve within the spout.

The principal objects of the invention are to provide a pouring spout for a flexible wall container which substantially eliminates any spillage of the liquid by providing a liquid pressure opened valve in the exit end of the container spout which may be opened by a manual squeeze of flexible container walls after the spout exit end has been placed within the receptacle opening receiving the liquid and wherein the spout is relatively economical in manufacture and may be reused as desired.

BRIEF DESCRIPTION OF THE DRAWINGS

FIG. 6 is a fragmentary view, similar to FIG. 1, of an alternative embodiment of the sliding piston valve;

FIG. 7 is a vertical cross sectional view, to a larger scale, taken substantially along the line 7—7 of FIG. 6 showing the valve in closed position;

FIG. 8 is a view, similar to FIG. 7, illustrating the valve in opened position;

FIG. 9 is a fragmentary elevational view of another embodiment of the pouring spout valve;

FIG. 10 is a fragmentary view, to a further enlarged scale, illustrating the details of the pouring spout valve of FIG. 9 in closed position;

FIG. 11 is a view similar to FIG. 10 illustrating the pouring spout valve in an open liquid discharge position;

FIG. 12 is a view similar to FIG. 2 of a further embodiment;

FIG. 13 is a view similar to FIG. 12 illustrating the pouring spout valve of FIG. 12 in opened position; and, FIG. 14 is a vertical cross section view, to an enlarged scale, of another embodiment illustrating by solid and dotted lines its respective closed and open position.

DESCRIPTION OF THE PREFERRED EMBODIMENTS

Figure 1:
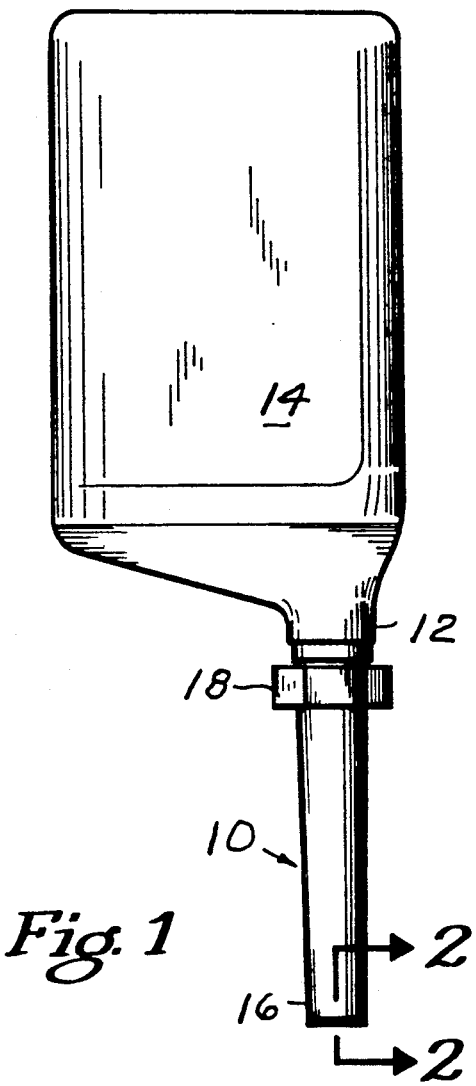
FIG. 1 is a side elevational view of the spout connected with a liquid container shown in inverted position.

Like characters of reference designate like parts in those figures of the drawings in which they occur.

In the drawings:

Referring first to FIGS. 1 through 5, the reference numeral 10 indicates one embodiment of the pouring spout connected with the spout or neck 12 of a flexible wall substantially conventional container 14.

The spout 10 is formed from tubular material such as plastic and may be of any desired length and capable of being flexed or bent or including an accordion-type wall intermediate its ends to facilitate a bending action between the container connected end and its pouring spout end 16.

The spout 10 is connected with the container by an internally threaded nut 18 or the like engaging the threads, not shown, of the container neck 12.

An open end sleeve 20 having a length at least equal to its diameter is disposed in contiguous wall contact with the inner wall surface 22 of the pouring spout end portion 16. The sleeve 20 is provided at its outward end with an outstanding flange 24 overlapping the end wall edge of the pouring spout end portion 16, the sleeve being bonded to the inner wall surface 22 in liquid-tight relation. Intermediate its ends, the sleeve 20 is provided with an inwardly projecting flange forming an annular stop 26 projecting inwardly a selected distance normal to the inner wall surface of the sleeve. Obviously the sleeve 20 could be manufactured as an integral part of the spout wall end portion 16 if desired.

A piston sleeve valve 28 is axially received for longitudinal sliding movement by the wall sleeve 20. The outwardly disposed end of the piston sleeve valve 28 is closed by an end wall 30 which radially projects beyond the outer perimeter of its sleeve portion to form an outstanding flange valve 32 projecting beyond the cylindrical plane of the piston sleeve valve a distance substantially equal to the radial width of the stop 26.

Similarly the inward end portion of the piston sleeve valve 28 is provided with an outstanding wall flange 34 dimensioned substantially equal with respect to its outstanding flange 32 and slidably contacting the inner wall surface of the wall sleeve 20 so that the annular stop 26 and the outstanding wall sleeve flange 34 form a guide for maintaining the piston sleeve valve in axial alignment with the pouring spout wall end portion 16 as the piston sleeve valve is opened and closed as presently explained.

A helical spring 36 surrounds the piston sleeve valve 28 between its outer end flange valve 32 and the wall sleeve annular stop 26 for biasing the piston sleeve valve outwardly of the spout end portion 16. As clearly shown by FIG. 4 the inner wall surface of the wall sleeve 20 adjacent its outer limit is provided with a part circular recess 38 for cooperatively receiving the part circular outer edge surface of the piston sleeve valve flange 32 to form a liquid-tight seal for the reasons presently apparent.

Alternatively, the sleeve end wall valve flange 32' may be provided with a part circular, in transverse section, annular recess 32" and a verge 40 may be formed on the inner surface of the piston sleeve wall 20 at its outer end for nesting the sleeve valve end wall flange 32' in liquid-tight seal relation.

Figure 3:
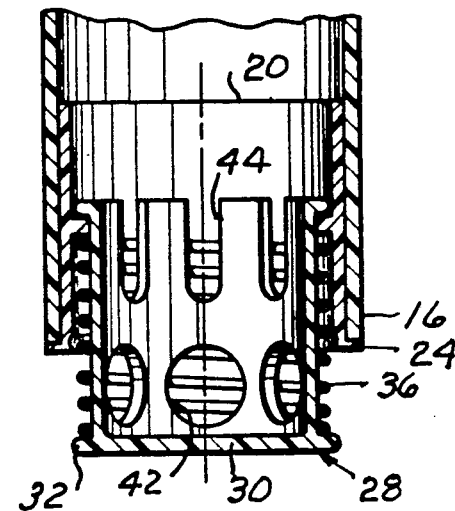
FIG. 3 is a view similar to FIG. 2 illustrating the valve in an open liquid discharge position.
Figure 5:
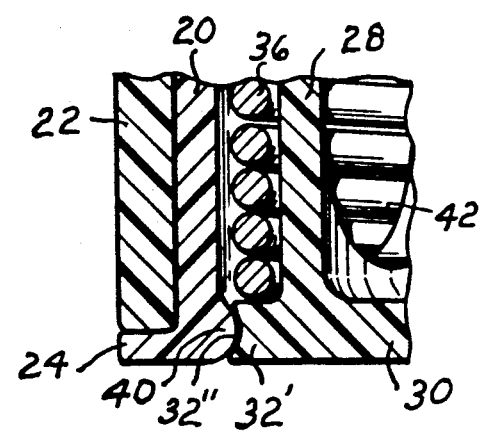
FIG. 5 is a view similar to FIG. 4, illustrating another manner of forming a valve seat.
Figure 4:
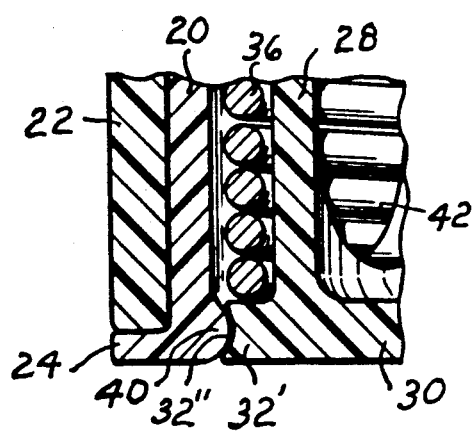
FIG. 4 is a fragmentary view to a further enlarged scale of the area substantially enclosed by the circular line 4.

The piston sleeve valve 28 is further characterized by a circumferential row of apertures 42 in its wall adjacent its closed end 30 for discharge of liquid, not shown, from the container 14 when the piston sleeve valve is in open position (FIG. 3). The inner end portion of the piston sleeve valve wall is longitudinally open-end slotted, as at 44, through its flange 34 in circumferentially spaced relation for bending this slotted wall end portion inwardly in a collapsing action upon itself to facilitate insertion of the piston sleeve valve 28 into the wall sleeve 20.

Referring also to FIGS. 6, 7 and 8, the reference numeral 10' indicates another embodiment of the pouring spout similarly formed from plastic tubing material having a discharge end portion 16' and a threaded nut portion 18' for connection with the neck 12 of the container 14.

In this embodiment the spout end wall portion 16' is thickened to form an inner diameter 21 adjacent its exit end substantially equal to the outside diameter of the piston sleeve valve 28' for slidably supporting the piston sleeve valve 28' and forming an annular inwardly facing shoulder to prevent movement of the piston sleeve valve out of the pouring spout.

In this embodiment the piston sleeve valve 28' is provided with a cup-like end wall 31 secured by its perimeter to the outer end surface of the piston sleeve valve flange 32 (FIG. 8) to form a closed compartment filled with dense metallic material 33.

The mass of the metallic material 33 at least in part compensates for the spring in the embodiment of FIGS. 1–5 in biasing the piston sleeve valve 28' outwardly in response to a manual squeeze on the walls of the container 14 to open the piston sleeve valve.

Referring also to FIGS. 9, 10 and 11, the sleeve wall and piston sleeve valve may be inserted as an assembly 45 into the neck 12 of a conventional container 14 and held in place by an open end cap-like ring 50.

The cap ring 50 open end or top may be further sealed by a removable conventional thin shipping seal 52, circular in configuration, overlying the open end of the cap ring and sleeve and valve assembly 45 for sealing the fluid in the container 14.

At the time of use, the seal 52 is manually removed so that pressure on the container walls 14 opens the piston sleeve valve to the position shown by FIG. 11.

Referring also to FIGS. 12 and 13, the numeral 60 indicates another embodiment of the piston sleeve valve and wall sleeve assembly which dispenses a measured predetermined quantity of liquid from a container when the flexible walls thereof are squeezed to open the valve assembly 60.

In this embodiment the wall sleeve 62 is provided with an inner end flange 64 projecting radially inward a distance substantially equal to the radial thickness of the sleeve wall stop 26. This sleeve wall flange 64 is provided with an annular valve seat 66 facing toward its supporting container.

The piston sleeve valve 68 is similar to the piston sleeve valve 28 having an outer end closing wall 70 and row of liquid discharge apertures 71 with the exception that the inner end of the wall of this piston sleeve valve is closed by an end wall 72 similar to the opposite or outer end wall 70 and seating on the valve seat 66. The inner end portion of the wall of the piston sleeve valve 68 is provided with a circumferential row of apertures 74. The piston sleeve valve 68 is further characterized by an annular outstanding flange 76 spaced toward its outer end wall 70 from its inner end wall 72 a distance at least twice the diameter of each aperture of the row of apertures 74 for the purposes presently apparent. A helical spring 78 surrounds the piston valve 68 between the wall sleeve flange 64 and the piston valve sleeve flange 76 for normally urging the piston sleeve valve 68 in an outward direction. The outer closed end wall 70 of the piston sleeve valve 68 is similarly provided with a valve seat on its perimeter flange 80 sealing with the inner wall surface of the sleeve wall 62 as shown by FIG. 12. When the sleeve valve assembly is in its container closed position of FIG. 12 it contains a predetermined quantity or volume of fluid to be dispensed from the container with which the assembly is connected. When the flexible walls of the container are manually squeezed the liquid forces the piston sleeve valve 68, to its outwardly disposed open position of FIG. 13. The fluid contained in the area defined between the piston sleeve valve ends 70 and 72 and the wall of the sleeve valve 68 is exhausted through its outer end apertures 71 into a suitable receptacle, not shown.

During the quick opening action of moving the piston sleeve valve 68 from its closed to its open position, some liquid will move through the inward end apertures 74 and outward apertures 71. Such quantity of liquid is closely estimated in arriving at the dimensions of the piston sleeve valve for the quantity of liquid desired to be dispensed at each opening of the valve assembly. If a second similar quantity of liquid is to be dispensed the piston valve 68 is moved from its liquid discharged and container closed position of FIG. 13 to the sleeve assembly fill position of FIG. 12 with the container with which the valve assembly 60 is connected held in an upright position. Thereafter the above opening and dispensing action is repeated.

Figure 14:
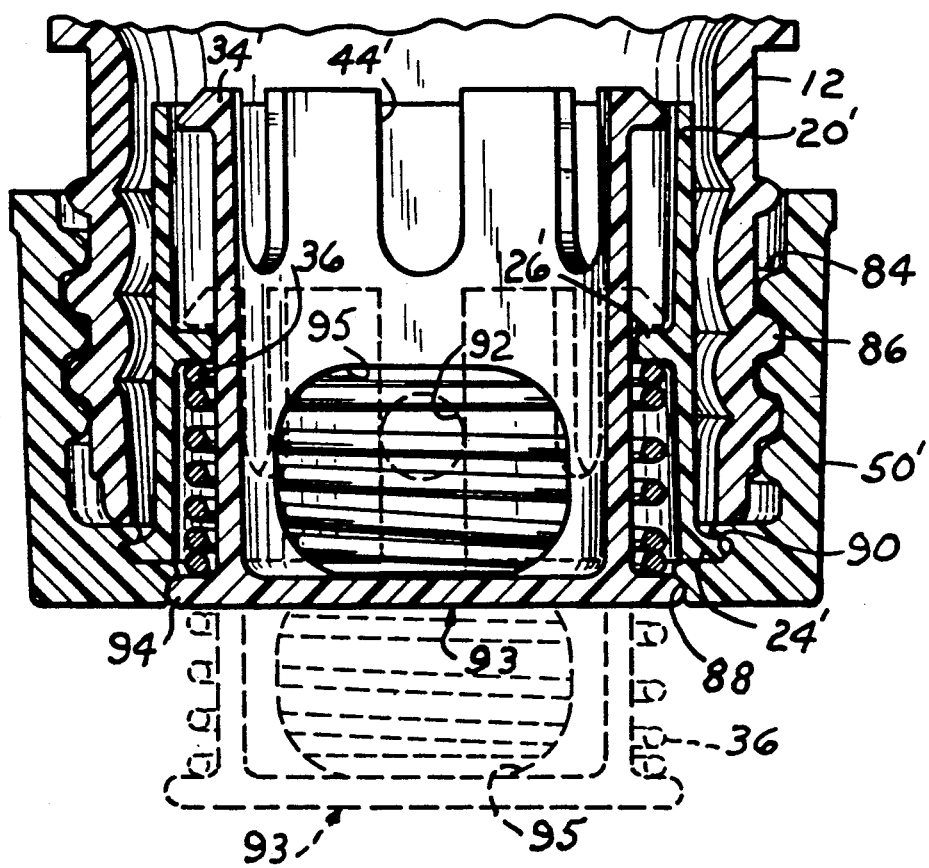

A further modified form of the liquid pressure released pouring spout valve is illustrated by FIG. 14 which permits automated filling of the container 14 and placing a cap thereon.

The container cap, indicated at 50', has internal threads 84 cooperatively received by the external threads 86 of the container neck 12.

The closed end of the cap 50' is centrally bored on a diameter substantially equal with the diameter of the piston valve sleeve 28 and the inner wall surface defining the bore is provided with an annular groove 88 arcuate in transverse section for the purposes presently explained.

Figure 2:
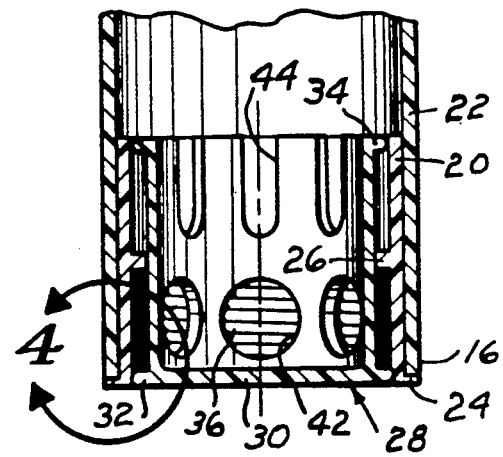
FIG. 2 is a fragmentary vertical cross sectional view, to a larger scale, taken substantially along the line 2—2 of FIG. 1 illustrating the pouring spout in valve closed position.

The end wall of the container cap 50' is thickened relative to the thickness of its threaded wall and provided with an annular recess 90 for cooperatively receiving the chamfered edge of the flange 24' of an open end sleeve 20' similar to the open end sleeve 20 of FIG. 2. The open end sleeve 20' similarly has an inwardly projecting flange 26' medially its ends. The outer end portion of the open end sleeve 20' has its wall provided with a plurality of longitudinally extending slots 92 open toward the outer end of the open end sleeve to permit flexing its flanged end inwardly to insert its flange 24' into the cap recess 90.

A modified form of the piston sleeve valve of FIGS. 2 and 3, indicated at 93 is similarly provided with an outstanding annular valve 94 having an arcuate perimeter sealingly received by the groove or valve seat 88 for closing the pouring spout neck 12.

The inward end of the piston valve sleeve is provided with an annular outstanding flange 34' having a chamfered edge to facilitate its insertion into the open end sleeve 20' beyond its inward flange 26'. Similarly, the inward end portion of the piston sleeve valve wall is slotted, as at 44', for inserting the piston sleeve through the open end sleeve 20'.

The outward end portion of the piston valve sleeve is provided with a diametrically opposite pair of fluid discharge wall apertures 95.

Similarly, the spring 36 is interposed between the sleeve flange 26' and the piston valve closed end flange 94 for assisting liquid pressure biasing the piston valve outward to its opened dotted line position.

Obviously the invention is susceptible to changes or alterations without defeating its practicability. Therefore, I do not wish to be confined to the preferred embodiment shown in the drawings and described herein.

I claim:

1. In a flexible wall container having a tubular liquid discharge neck portion characterized by external threads at its terminal end, the improvement comprising:
    an elongated pouring spout having means at one end portion for securing it to the the container neck portion;
    a piston sleeve valve secured to and normally closing the other end portion of said spout,
    said spout including
    an annular inwardly extending projection on the inner wall surface of said other end portion of said spout forming an annular stop;
    an annular valve seat on the spout inner periphery adjacent its end opposite the container;
    said piston sleeve valve having a sleeve wall portion slidably received by said other end portion of said spout and having a closed end,
    said piston sleeve wall having a plurality of circumferentially spaced apertures adjacent its closed end;
    a piston valve seat on the perimeter of said closed end of said piston sleeve valve for normally sealing with said spout annular valve seat; and,
    outstanding flange means on the inner end of said piston sleeve wall for engaging said annular stop in response to axial outward movement of said piston sleeve valve relative to said other end portion of said spout,
    said piston sleeve valve being biased to a spout open position by liquid pressure when the container is inverted and opposing walls of said container are forced inwardly toward each other, 2. The combination according to claim 1 and further including:
    resilient means including a spring surrounding said piston sleeve valve between its closed end and the annular stop for biasing said piston valve to a spout open position.

3. The combination according to claim 1 and further including:
    means including a gravity responsive mass attached to the piston sleeve valve closed head end wall for biasing said piston sleeve valve to a spout open position when said container is inverted.

4. A normally closed fluid pressure opened cap assembly for a liquid container externally threaded pouring spout, comprising:
    a pouring spout cap threadably engaged with the spout and having a centrally bored end wall having an annular valve seat on the surface defining the perimeter of the cap end wall bore,
        said cap end wall having an annular groove of greater diameter than the valve seat, said groove spaced inwardly of the valve seat;
    an open end sleeve axially disposed within the cap and having an annular outstanding flange nested by the annular groove,
        said open end sleeve having an annular flange on its inner periphery; and,
    a piston sleeve valve axially contained slidably by said open end sleeve and seated on said valve seat for normally closing said container.

5. The combination according to claim 4 in which said piston sleeve valve includes:
- a piston valve having a sleeve wall closed at one end and slidably received within said open end sleeve and having a plurality of circumferentially spaced apertures adjacent its closed end;
- a piston valve seat on the perimeter of said piston sleeve wall closed end for normally sealing with said annular valve seat; and,
- outstanding flange means on the inner end of said piston sleeve wall for engaging said open end sleeve inner flange in response to axial outward opening movement of said piston sleeve valve.

6. The combination according to claim 5 and further including:
- resilient means including a spring surrounding said piston sleeve wall between its closed end valve and the open end sleeve inner flange for biasing said piston piston valve to a open position when the piston sleeve valve is unseated.

7. In a flexible wall container having a tubular liquid discharge neck portion characterized by external threads at its terminal end, the improvement comprising:
- an elongated pouring spout having means at one end portion for securing it to the container neck portion;
- an open end sleeve secured to the inner periphery of the spout opposite the container;
- an annular inwardly projecting flange at the inner end of said sleeve;
- an annular valve seat on the inner periphery of the outer end portion and annular flange, respectively, of the sleeve;
- a piston sleeve valve having an annular outwardly projecting flange on its outer wall surface intermediate its ends slidably received by the inner wall surface of said sleeve and having closed inner and outer end;
- said piston sleeve wall having a plurality of circumferentially spaced apertures adjacent its inner and outer closed ends, respectively; and,
- a piston valve seat on the perimeter of said piston inner closed end for sealing with said sleeve inner and flange valve seat when the piston sleeve valve is moved from its spout closed position to its liquid discharge open position.

8. The combination according to claim 7 and further including:
- resilient means including a spring surrounding said piston sleeve valve between its annular flange and the sleeve annular flange for biasing said piston valve to its open position.

* * * * *